J. H. STEWART.
SKIVING MACHINE.
APPLICATION FILED MAY 19, 1914.

1,142,281.

Patented June 8, 1915.
4 SHEETS—SHEET 4.

Witnesses:

Inventor:
John Hammond Stewart
by Hught Brown Quinby & May
Attorneys

UNITED STATES PATENT OFFICE.

JOHN HAMMOND STEWART, OF LYNN, MASSACHUSETTS.

SKIVING-MACHINE.

1,142,281.  Specification of Letters Patent.  Patented June 8, 1915.

Application filed May 19, 1914.  Serial No. 839,526.

*To all whom it may concern:*

Be it known that I, JOHN HAMMOND STEWART, a citizen of the United States, and resident of Lynn, in the county of Essex and State of Massachusetts, have invented certain new and useful Improvements in Skiving-Machines, of which the following is a specification.

The present invention relates to a machine for skiving, or trimming on a bevel, the edges of articles of various sorts, such, for instance, as are used in the manufacture of shoes, and particularly such pieces as are used for stiffening the counters and toes of shoes.

In this application I have illustrated and described an embodiment of my invention designed particularly for thus skiving or beveling counter stiffeners, or counters, as they are usually termed in the art; but in illustrating this particular embodiment of the invention I have not intended to limit the invention to a machine designed and adapted for operating upon that particular class of articles, or to exclude from the scope of the invention machines for skiving or trimming the edges of any sort of article, provided the machine has the essential characteristics hereinafter described and particularly pointed out in the claims.

The object of the invention briefly stated is to provide a means for skiving or trimming the edge or edges of an article, or piece, with a drawing cut by means of a knife which travels continuously in one direction in making the cut throughout the entire length of the edge or edges of the article acted upon.

The particular embodiment of the invention here illustrated comprises the combination with means for feeding articles to be acted upon, of a knife which is arranged to reciprocate transversely to the direction of feeding, and means for moving the knife at such a rate of speed and with such an extent of motion that its action is continuous in one direction throughout the entire period required for the feeding of the article past the knife.

Figure 1:
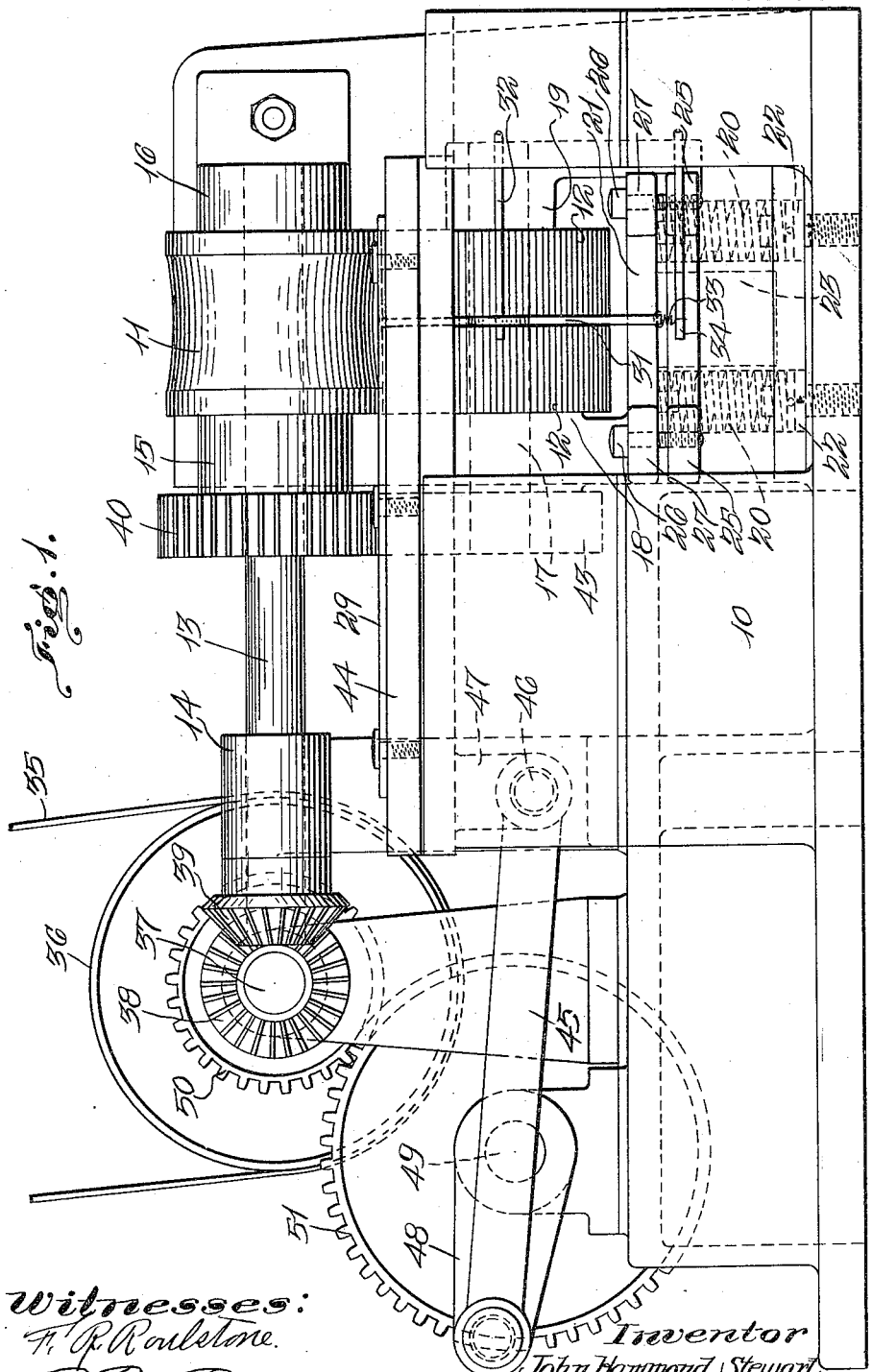
Figure 2:
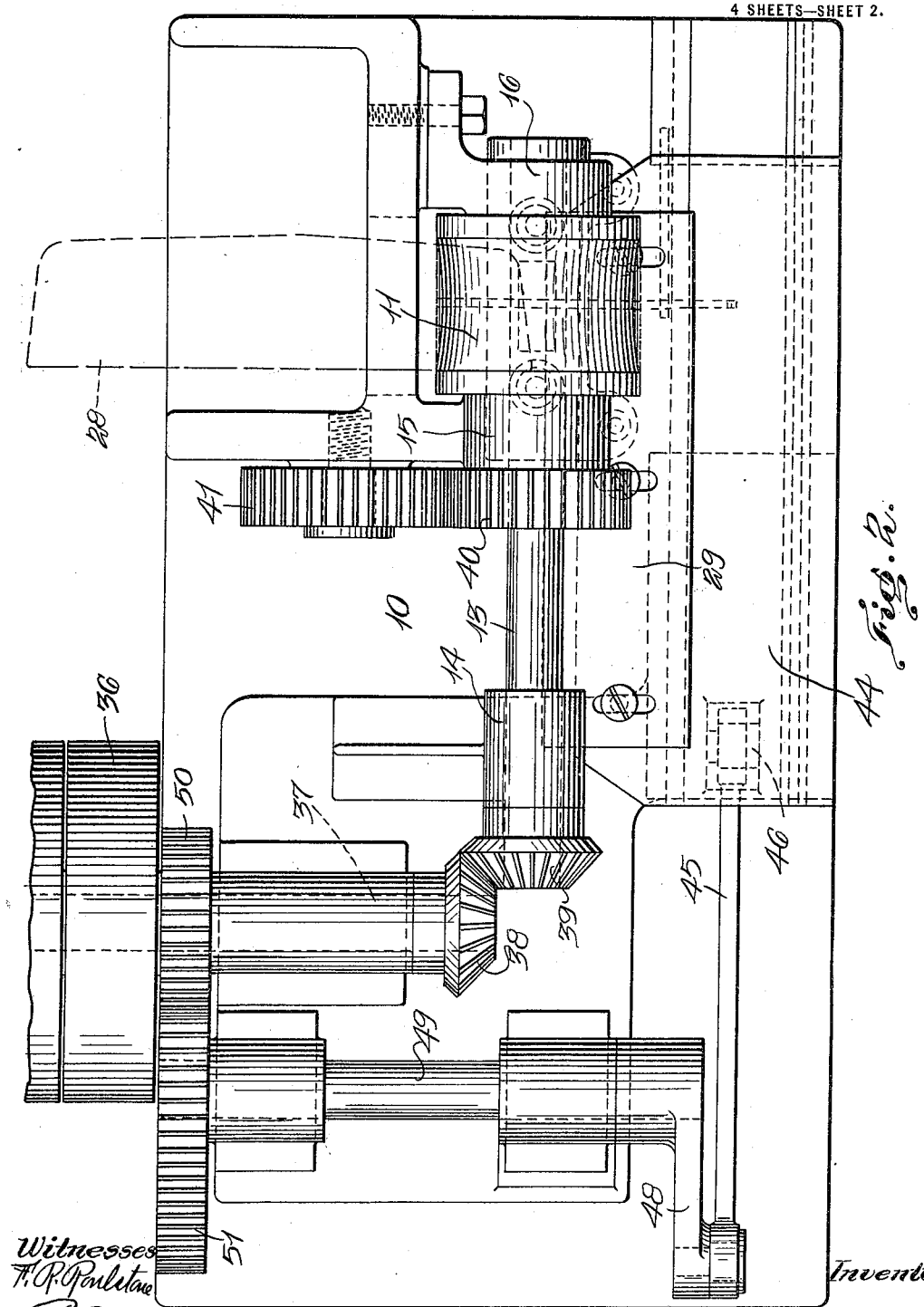
Figure 3:
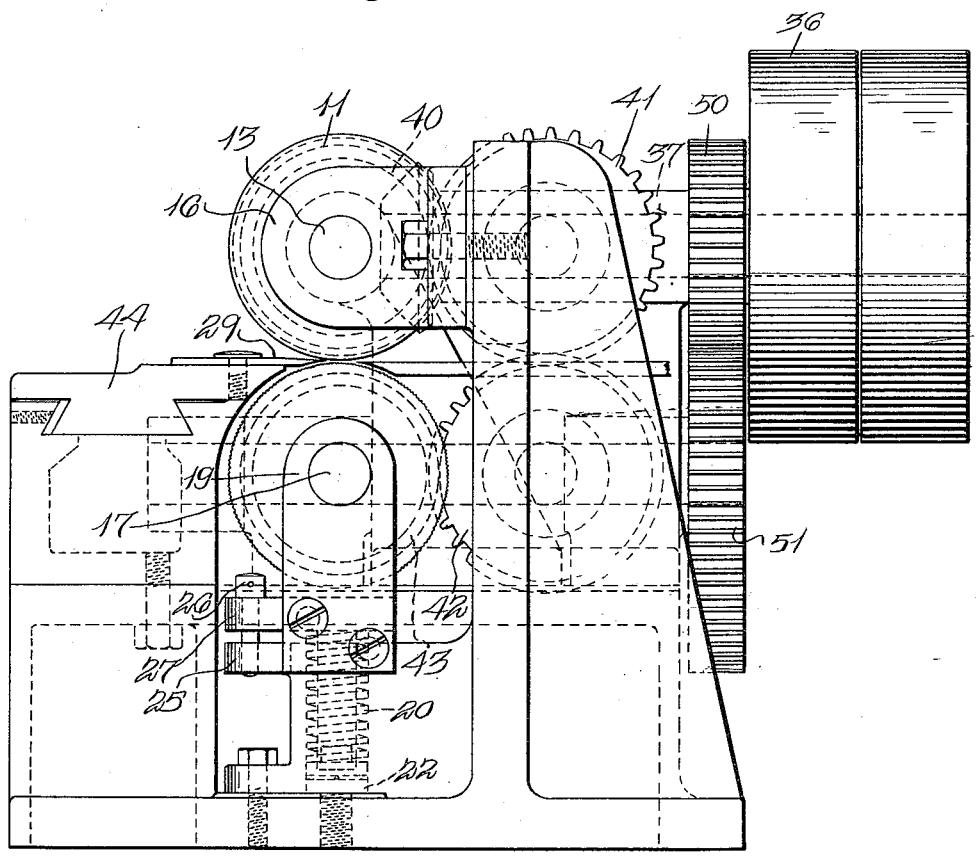
Figure 4:
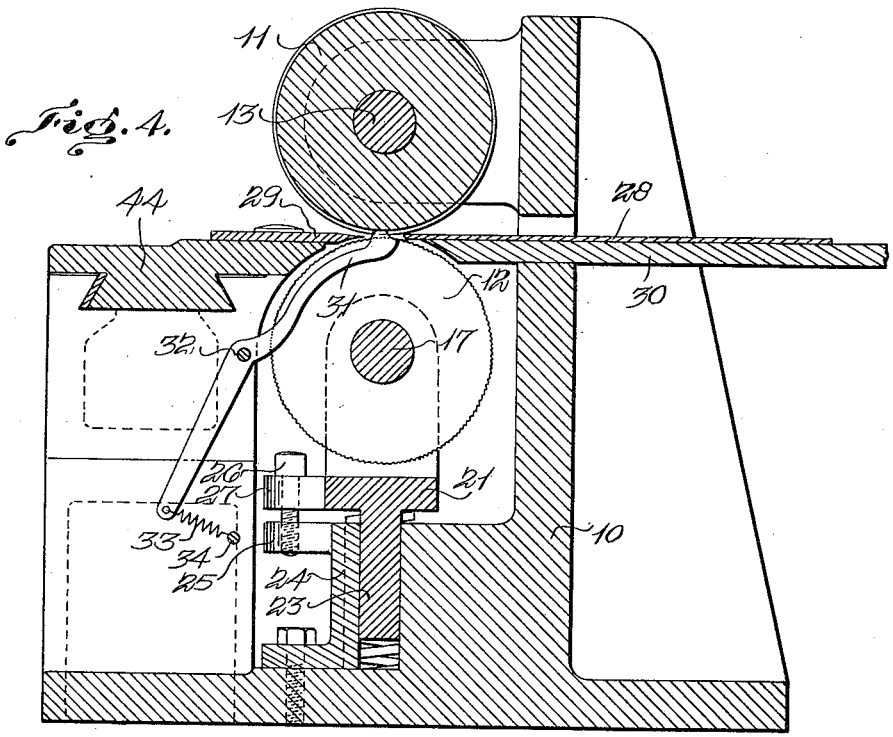
Figure 5:
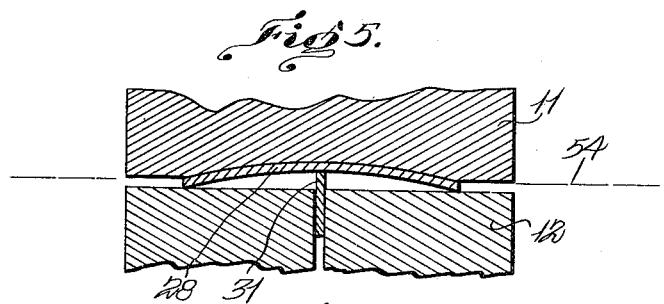
Figure 6:
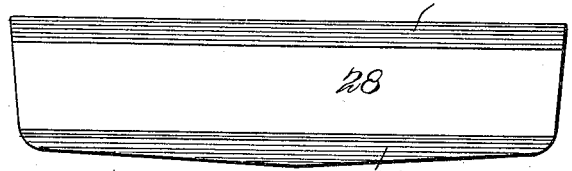

In the drawings in which I have illustrated the above mentioned embodiment of my invention, Figure 1 shows in rear elevation the machine comprising such embodiment of the invention. Fig. 2 is a plan view of the machine. Fig. 3 is an end view as seen from the right of Figs. 1 and 2. Fig. 4 is a vertical cross section of the machine through the center of the feeding means. Fig. 5 is a fragmentary sectional view of the feeding rolls employed in the machine and of the work engaged with the rolls, such section being a plane including the axes of the roll. Fig. 6 is a plan view of one of the articles acted upon by the machine, after having been operated upon.

The same reference characters indicate the same parts in all the figures.

Referring to the drawings, 10 represents the base of the machine on which are mounted standards and bearings of proper construction and arrangement to support the operating parts. The work is fed by means of rolls 11 and 12, the former being mounted upon a shaft 13, which turns in bearings 14, 15, and 16, supported as clearly indicated in the drawings, and the latter being mounted upon a shaft 17 rotatably mounted in bearings or boxes 18 and 19, which are yieldingly supported by springs 20 pressing against a bar 21 to which the boxes are fastened. The yielding roll 12 is arranged below the unyielding roll 11, and is pressed upwardly toward the latter by the springs 20, such springs being contained in sockets in the base portion of the machine and abutting against the heads of screws 22, the latter being adjustable to regulate the force applied by the springs. The up and down movement of the yielding roll is guided by a tongue 23 projecting from the plate or bar 21 into a groove in the base, in which it is retained by a cover plate 24 secured to the base as shown in Fig. 4 and having lugs 25. The said lugs receive stop screws 26 threaded thereinto and passing through lugs 27 formed on the bar or plate 21, the heads of such screws being above the lugs 27 and serving to limit the approach of the yielding roll toward the unyielding roll.

The work treated by the machine, which is here shown as being a shoe counterblank 28, is fed between the rolls 11 and 12 and is skived by a knife 29 arranged to engage the work as the latter passes the nip of the rolls. A table or work support 30 is arranged in an approximately horizontal position at approximately the height of the nip of the rolls so as to guide the work thereto. The springs 20 cause the work to be gripped with sufficient force to carry it past the knife and at the same time permit the roll 12 to yield for irregularities in the thickness of the work, while the stops 26 keep the rolls apart sufficiently to permit ready entrance of the advancing end of the work.

Where the machine is designed for skiving or beveling at the same time the opposite edges of a strip-like piece, as in this instance, the roll 11 is concaved or recessed between its ends, and means such as a finger or presser 31 is provided for bending up the central part of the work or blank into the groove of the roll and above the plane of the knife edge, so that only the edge portions of the blank are engaged by the knife. The presser finger here shown is pivoted on a rod 32 and its operative end is pressed toward the roll 11 by a spring 33 connected at one end with an arm of the presser and at its other end to a fixed pin 34. The roll 12 is provided with a deep groove in its middle portion to receive the presser and to permit the latter to sink within its periphery. If desired, the roll 12 may be made in two parts sufficiently separated to admit the presser finger between them.

Motion is given to the rolls by a belt 35 or equivalent driver which drives a pulley 36 on a driving shaft 37, the latter being geared to the roll shaft 13 by miter gears 38, 39. Equal motion is transmitted from the shaft of roll 11 to the shaft of roll 12 by a train consisting of a gear 40 on the shaft 13, idle gears 41, 42 of which the former meshes with gear 40, and a gear 43 on the shaft 17 of roll 12 in mesh with the idler 42. This gear train causes the rolls to rotate in relatively opposite directions, so that the adjacent points of both move in the feeding direction, and permits the necessary yielding of the roll 12. The gears may be mounted in any way suitable for transmitting the above described motion.

The knife 29 is mounted upon a slide 44 mounted reciprocatively in a guideway in the rear part of the machine base. The knife, slide, and guideway extend at approximately right angles to the direction of feeding and in a plane such that the knife will act on the desired portion or portions of the work. In the present machine the knife edge travels in a horizontal plane slightly above the work supporting surface of the table 30, which is also horizontal. Reciprocating motion is given to the knife by a link or connecting rod 45 connected with the slide 44 by a wrist pin 46 carried in a lug 47 on the under side of the slide, and the connecting rod is driven by a crank 48 on a shaft 49, which latter is driven from the drive shaft 37 by gears 50 and 51 secured to said shafts respectively.

Essential characteristics of the knife and of its driving means are that the knife be longer than the extent of its motion by at least the width of the part of the work piece on which it acts, and that it should make only one continuous stroke while the entire piece of work is fed past it. In this machine, where the knife cuts simultaneously the opposite edges of a strip-like piece, its length is at least as great as the width of the piece plus the extent of travel of the knife, and the driving gears 50, 51 are proportioned to cause the knife to make one complete stroke and no more in the time required for a complete rotation of the feed rolls. Hence the gear 50 has half as many teeth as the gear 51 and the knife is thereby caused to make a stroke in one direction while the feed rolls make one complete revolution, and to make a stroke in the opposite direction while the feed rolls make a second consecutive rotation.

In the operation of the machine the attendant so feeds the work pieces that they are gripped by the feed rolls at the time when the knife is at or near either end of its stroke. If an automatic mechanism should be provided for supplying the work pieces to the machine, such mechanism would be timed to secure the same effect. The feed rolls then force the work pieces across the edge of the knife and at the same time the knife is moved transversely to the feeding direction, making a drawing cut which is continuous and of the same character from one end of the piece to the other. As a result the work is skived with a smooth clean cut, without being torn, and without the ridges or inequalities which would be produced if the knife should be reversed in direction before completing the cut. In Fig. 6 I have shown a counter blank after being skived by machine, in which the shaded portions 52 and 53 at its opposite longitudinal edges represent the bevels produced by the skiving knife. Fig. 5 shows the manner in which the presser 31 bends up the central part of the blank so that only its edge portions are cut. In this figure the broken line 54 represents the edge of the knife.

I have previously intimated that I do not limit the invention to machines adapted to produce only skived counters, neither do I limit the invention to a machine, whatever may be the type of articles on which it acts, in which the knife is driven by a connecting rod and a crank rotating once for each rotation of the feed rolls. In the present machine where the circumference of each feed roll is greater than the length of the article acted upon, the gear ratios are such as to produce one stroke of the knife while the feed rolls make a complete rotation, but it would be within the scope of my invention to provide larger or smaller feed rolls, and gearing for driving the knife more or less rapidly, provided the feed rolls and driving mechanism are so proportioned that the time required for the knife to make a complete stroke is at least as long as that required for the article, or at least that portion of the article on which the knife acts, to travel past the knife.

What I claim and desire to secure by Letters Patent is:

1. A skiving machine comprising a rotating feed roll, a skiving knife mounted to travel back and forth across the line in which that portion of the work acted upon by the knife is fed, and mechanism for so moving said knife at such a rate that each stroke of the knife requires for completion approximately the time required for a complete rotation of the feed roll.

2. A skiving machine comprising a rotating feed roll, a knife arranged to reciprocate across the line in which work is fed by the feed roll and mechanism for moving said knife back and forth at such a rate as to cause the knife to make one complete stroke while the feed roll makes one complete rotation.

3. A skiving machine comprising a rotating feed roll, a back and forth moving knife arranged to travel in a line across the line in which work is fed by said roll, a crank shaft for moving said knife back and forth and gearing for rotating said roll and said shaft simultaneously at such rates that the roll makes two rotations while the shaft makes one rotation.

4. In a skiving machine, a work feeding roll, a reciprocating knife arranged to act upon work fed by the roll, and means for reciprocating said knife and rotating said roll at rates such as to give the roll approximately a complete rotation for each stroke of the knife.

5. A skiving machine comprising in combination a feeding roll, a rigid slide mounted adjacent to the delivery point of said roll and being movable across the line of feed of the roll, a crank and connecting rod mechanism for reciprocating said slide, a knife mounted on the slide with its edge directed toward the said delivery point, and interconnected gearing connected with the roll and crank designed and constructed to give said slide and knife one complete stroke during the time required for a complete revolution of the feed roll.

6. A counter blank skiving machine, comprising a matrix roll and a coöperating pressure feed roll, said matrix roll having a circumferential extent as great as the longest counter blank, driving gearing for rotating said roll, a skiving knife arranged in the line in which work is fed by said rolls and mounted to move across such line with its edge directed toward the rolls, a connecting rod connected with one end of said knife, a crank coupled to said connecting rod, and gearing arranged and constructed to rotate such crank at half the angular speed of rotation of said matrix roll.

7. A counter skiving machine comprising in combination a matrix roll having a peripheral groove and a circumferential length as great as the longest counter, a complemental feed roll, a device for pressing the central part of a counter passing between said rolls into the groove of said matrix roll, a skiving knife arranged adjacent to and with the edge toward the delivery point of said rolls and extending across the line of feed of said rolls, said knife being movable longitudinally of its edge, a crank coupled with said knife for reciprocating the same, and gearing positively connecting said crank and said matrix roll together and constructed to cause the crank to rotate at one-half the angular rate of rotation of the matrix roll, whereby the knife is caused to make a complete stroke in one direction during one complete revolution of the roll.

In testimony whereof I have affixed my signature, in presence of two witnesses.

JOHN HAMMOND STEWART.

Witnesses:
 CHARLES W. BAILEY,
 ANNIE S. WATTERS.

Copies of this patent may be obtained for five cents each, by addressing the "Commissioner of Patents Washington, D. C."